United States Patent [19]

van Leeuwen

[11] Patent Number: 4,795,508

[45] Date of Patent: Jan. 3, 1989

[54] SOLDERING COMPOSITIONS

[75] Inventor: Petrus W. N. M. van Leeuwen, Amsterdam, Netherlands

[73] Assignee: Shell Internationale Research Maatschappij B.V., The Hague, Netherlands

[21] Appl. No.: 11,474

[22] Filed: Feb. 5, 1987

[51] Int. Cl.$^4$ .................. B23K 35/34; H01B 1/06; B32B 15/00; B32B 9/00

[52] U.S. Cl. .................... 148/23; 252/512; 252/500; 148/24; 428/385; 428/387

[58] Field of Search .................. 252/512–514, 252/518, 500; 148/22, 23, 24; 106/240, 286.4, 287.15, 1.05; 428/387, 385

[56] References Cited

U.S. PATENT DOCUMENTS

| 3,428,497 | 2/1969 | Coless | 148/23 |
| 3,663,313 | 5/1972 | Oberly et al. | 148/23 |
| 4,166,879 | 9/1979 | Hayashi et al. | 148/23 |
| 4,391,742 | 7/1983 | Steigerwald et al. | 252/512 |
| 4,512,822 | 4/1985 | Bassinger et al. | 148/23 |
| 4,595,604 | 6/1986 | Martin et al. | 252/514 |
| 4,662,952 | 5/1987 | Barringer et al. | 148/23 |
| 4,680,141 | 7/1987 | Barajas | 252/512 |

FOREIGN PATENT DOCUMENTS 1550648 8/1979 United Kingdom .

Primary Examiner—Josephine Barr

[57] ABSTRACT

Soldering composition incorporating a flux, characterized in that as flux at least one compound is employed with the general formula

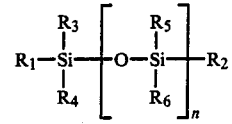

in which n is a number from 0 to 6, all groups $R_1$ to $R_6$ are identical or different aryl groups, of which at least one carries a $COOR_7$ substituent, in which $R_7$ represents hydrogen, an alkyl or aryl group with a maximum of 12 carbon atoms, and in which $R_1$ and $R_2$ can be one and the same aryl group, thus forming a cyclic compound.

5 Claims, No Drawings

SOLDERING COMPOSITIONS

Soldering compositions incorporating one or more fluxes are known. A very well-known product is cored solder with a flux of rosin, which usually also includes an activator.

There is increasing resistance on environmental grounds to the use of cored solder and other sorts of soft, fluxed solder of lead-tin alloys. The required high temperatures give rise to decomposition products, which are released to the atmosphere in the form of sharp, pungent smoke (formaldehyde). For this reason, soldering tends to be considered unacceptable work.

To create a substitute for rosin, it has already been proposed in GB-A No. 1550648 to employ an ester of a polyhydric alcohol, e.g. penta erythritol, as a soldering flux. There are, however, a number of practical problems associated with this proposal. For example, the flux action is relatively weak, so that flux activators are also needed. Moreover, a sticky and non-transparent residue remains behind after soldering and hampers the visual inspection of the soldering point.

It is an object of the present invention to overcome these drawbacks and to this end the invention provides a soldering composition incorporating a flux, characterized in that as flux at least one compound is employed with the general formula

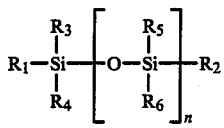

in which n is a number from 0 to 6, all groups $R_1$ to $R_6$ are identical or different aryl groups, of which at least one carries a $COOR_7$ substituent, in which $R_7$ represents hydrogen, an alkyl or aryl group with a maximum of 12 carbon atoms, and in which $R_1$ and $R_2$ can be one and the same aryl group, thus forming a cyclic compound.

Suitable $R_1$ to $R_6$ aryl groups are phenyl, naphthyl, anthracyl, phenanthryl, and higher condensed aromatic systems in so far as they are not carcinogenic. Phenyl groups are the most preferred. The number n is preferably smaller than 3, most preferably 0 or 1. In general, COOH substituents perform better than ester groups. If ester groups are used, there is a preference for alkyl esters in which the alkyl group does not contain more than 6 carbon atoms; for example methyl, isopropyl, n-propyl, ethyl or isobutyl. The number of $COOR_7$ substituents in the flux compound will preferably not exceed 1.

Examples of suitable compounds are:
4-carboxyphenyl-triphenyl silane, 3-carboxyphenyl-triphenyl silane, 4-methoxycarbonyl-phenyl-triphenyl silane,
3-isopropoxycarbonylphenyl-triphenyl silane,
4-ethoxycarbonylphenyl-triphenyl silane,
4,4'-bis-carboxyphenyl-diphenyl silane,
4,4'-bis(ethoxycarbonylphenyl)-diphenyl silane,
4,4'-bis-(carboxyphenyl)-tetraphenyl siloxane,
4,3'-bis(carboxyphenyl)-tetraphenyl siloxane,
4-carboxyphenyl-pentaphenyl siloxane,
4-carboxyphenyl-4'-methoxyphenyl-diphenyl silane,
4-carboxyphenyl-6'-bisphenyl-diphenyl silane,
4-carboxyphenyl-triphenyl silane,
4,4'-bis(carboxyphenyl)-tetranaphthyl siloxane,
4,4'-bis(carboxyphenyl)-hexaphenyl siloxane and
4-carboxyphenyl-trianthracyl silane.

All these compounds can be synthesized in a known manner: condensation of triphenyl silicon chloride with p-chlorotoluene in the presence of a reducing metal, followed by oxidation of the methyl group with molecular oxygen gives 4'-carboxyphenyltriphenyl silane; corresponding siloxanes can be prepared via condensation of silicon chlorides by extraction of chlorine with water with the release of hydrochloric acid.

The soldering composition according to the invention can be employed in the customary forms, e.g. as wire, tape, sheet, tablet, disc, etc. The scope of the invention also includes the preparation of the composition in situ during soldering. This is particularly attractive in the production of printed wiring in which a wiring pattern consisting of the flux of this invention is applied to a conducting surface. The conductor surface not covered by the pattern is then etched away and finally the electronic components and solder are applied. Flux and solder then react together at the solder points, thus forming the composition of the invention in situ. Analoguous in-situ formation is in principle also possible in other applications comprising the stepwise application of flux and solder.

In those cases in which the fluxing action of the compounds used in the invention is still not optimum, one of the customary activators can be added. In addition, hardeners can also be incorporated in the composition.

The invention will now be further illustrated with the aid of a few examples.

EXAMPLES

Tests were carried out with 60/40 lead/tin solder at 250 and 300° C. The spread in $cm^2$ of 0.172 g solder with 0.005 g flux on a 5×5 cm copper plate was determined, and also the wetting time, in seconds, with a meniscograph, by dipping to a depth of 2 mm a 1 cm wide copper strip cleaned with IPA. The smoke evolution was observed and the formaldehyde generation was measured after pyrolysis for 1 minute at 350° C. in an oven and sucking away the entire vapour phase for 10 minutes. The vapour was absorbed in water and the formaldehyde concentrate was measured colorimetricaly according to the method of L. C. Thomas and G. J. Chamerman ("Colorimetric Chemical Analysis Methods, 1974, Tintometer Sales Ltd, England"). The fluxing action of the following compounds was tested:
1. 4-carboxyphenyl-triphenyl silane
2. 3-carboxyphenyl-triphenyl silane
3. 3-methoxycarbonylphenyl-3'-carboxyphenyl-diphenyl silane
4. 4,4'-dicarboxyphenyl-diphenyl silane
5. 4-carboxyphenyl-pentaphenyl siloxane, and for comparison
   a. a mixture of rosin and di/triethyl ammonium bromide as flux activator
   b. a mixture of penta-erythritol-tetrabenzoate and the flux activator mentioned in system a
   c. penta-erythritol-tetrabenzoate.

The test results are given in the table in which the pyrolysis data are represented by a relative scale:
+ + objectionable quantities
+ much
± noticeable
− little or none It can also be pointed out that system b is corrosive in the standard test BS 5625 (21 days), due to the presence of chlorides. This does not apply to compounds 1 to 5.

TABLE

|   | Spread | | Wetting | | Pyrolysis | |
|---|--------|--------|--------|--------|--------|--------|
|   | 250° C. | 300° C. | 250° C. | 300° C. | CH$_2$O | Smoke |
| 1 | 1.0 | 1.2 | 1.4 | 0.5 | — | — |
| 2 | 0.4 | 0.7 | 1.5 | 0.7 | — | — |
| 3 | 1.0 | 0.7 | 1.6 | 0.7 | — | — |
| 4 | 0.9 | 1.0 | 1.2 | 0.6 | — | — |
| 5 | 0.9 | 1.2 | 1.9 | 0.7 | — | — |
| a | 1.0 | 0.9 | 0.6 | 0.4 | ++ | ++ |
| b | 1.1 | 0.8 | 1.3 | 1.1 | ± | ± |
| c | 0.2 | 0.3 | 5.2 | 3.9 | ± | ± |

I claim:

1. Soldering composition comprising a lead-tin alloy employed with a fluxing effective amount of at least one compound with the general formula

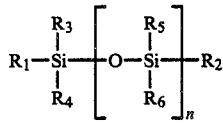

in which n is a number from 0 to 6, all groups $R_1$ to $R_6$ are identical or different aryl groups, of which at least one carries a COOR$_7$ substituent, in which R$_7$ represents hydrogen, an alkyl or aryl group with a maximum of 12 carbon atoms, and in which $R_1$ and $R_2$ can be one and the same aryl group, thus forming a cyclic compound.

2. Composition according to claim 1, characterized in that all groups $R_1$ to $R_6$ are phenyl groups.

3. Composition according to claim 1 or 2, characterized in that n is zero or one.

4. Composition according to claim 1 or 2, characterized in that the compound contains one or two COOH substituents.

5. Soldering wire, tape, sheet, rod, tablet or disc consisting of a composition according to one or more of claims 1 or 2.

* * * * *